UNITED STATES PATENT OFFICE.

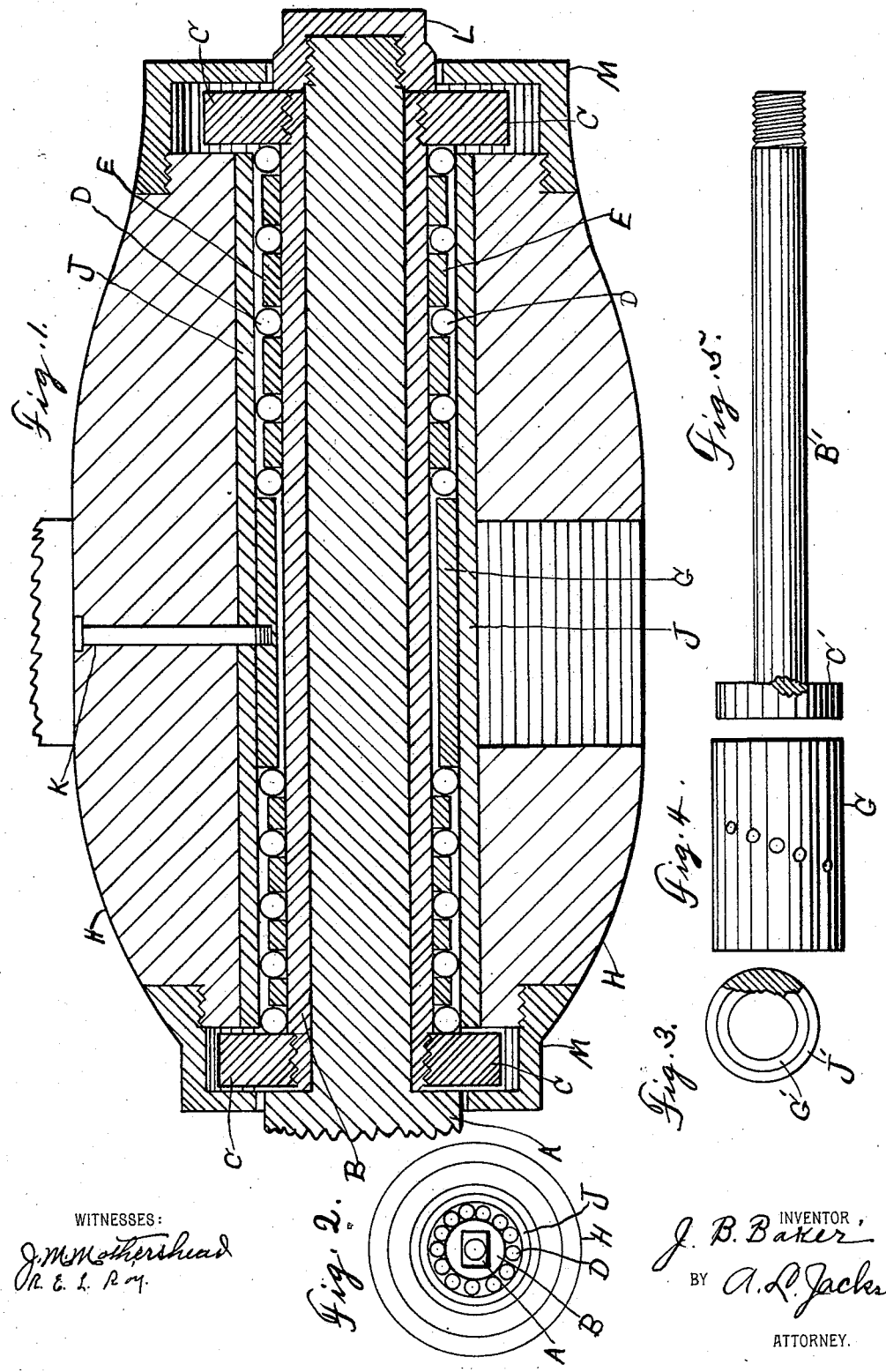

JOSEPH B. BAKER, OF NAPLES, TEXAS.

BALL-BEARING.

SPECIFICATION forming part of Letters Patent No. 575,798, dated January 26, 1897.

Application filed November 10, 1896. Serial No. 611,632. (No model.)

*To all whom it may concern:*

Be it known that I, JOSEPH B. BAKER, a citizen of the United States, residing at Naples, Texas, have invented certain new and useful Improvements in Ball-Bearings, of which the following is a specification.

This invention relates to ball-bearings; and it consists in improvements in hubs or journal-boxes and in the journals of axles or spindles, which will be fully described, and then particularly pointed out in the claims.

The object is to construct journals and journal-boxes which will be perfectly adjustable and durable and which will be subjected to the least possible friction.

Reference is had to the accompanying drawings, forming a part of this specification.

Figure 1 is a longitudinal sectional view in detail. Fig. 2 is an end view of the journal and journal-box with the nut and cap removed. Fig. 3 shows a modification of the middle ring or thimble for holding the balls in place. Fig. 4 shows the adjustable feature of the middle ring or thimble. Fig. 5 shows a modification in the thimble which surrounds the end of the axle or shaft.

Similar characters of reference indicate the same parts throughout the several views.

In the drawings, A indicates the axle or shaft, which is square in cross-section and is inclosed in a thimble B, having a square opening for said axle or shaft. Threads are cut on the ends of this thimble for nuts or washers C C, which are screwed on the thimble to hold the balls and rings (hereinafter described) in place. A series of balls D bear on the thimble B and are held apart by a series of rings E. These rings fit close around the thimble B and are in thickness about two-thirds of the diameter of the balls D. The hub or journal-box H has an interior hardened thimble J, which constitutes an outer bearing for balls D. Thimble B, which is hardened by chilling, constitutes an inner bearing for balls D. An interior thimble G is attached to the inside of thimble J substantially in the central part thereof. Thimble G holds balls D and rings E in place. This thimble or washer has the same thickness as rings E, that is, the thickness of it is a third less than the diameter of the balls D. Thimble G is held in place by set-screws K, as shown in the upper part of Fig. 1. There may be one or more of these set-screws which penetrate the hub or box H and thimble J and into the outer part of the thimble G. Thimble G has several threaded recesses by which the thimble can be adjusted. A part of a spoke is shown at the top of Fig. 1, and a recess for a spoke is shown at the bottom part of said figure. The hub H and thimble J do not extend to the nuts C C. A space is left, so that there will be no friction. The width of this space is about the same as one-fourth of the diameter of the adjacent balls. The complete hub or journal-box is held in place by a nut L. Caps M M are screwed on each end of hub H to protect the interior parts from dust and mud and water. These caps reach inward beyond the outer rims of nuts or washers C C. Thimbles B and J are preferably made of steel; but all the parts are to be made of practical material.

Instead of making thimbles G and J as described they may be made integral, as illustrated in Fig. 3, and one of the nuts or washers C' may be made integral with thimble B', as illustrated in Fig. 5. When thimble G is made integral with thimble J, there must necessarily be a removable washer or nut on each end of thimble B. In journal-boxes which have too small spaces between the spokes for set-screws two thimbles G or washers may be used, one on each side of center row of balls. The thimbles J and B are to have hardened surfaces next to the balls.

I do not limit my invention to any particular size or dimension.

The invention can be used on any kind of a vehicle and on shafts of various kinds, whether vertical or horizontal.

Having fully described my invention, what I claim as new, and desire to secure by Letters Patent, is—

1. A journal provided with two concentric thimbles, a plurality of rows of balls surrounding the inner thimble and having bearings against the inner surface of the outer thimble, rings fitting closely the outer surface of said inner thimble and adapted to hold said rows of balls in place, a shorter thimble fitting closely the interior of said outer thimble and attached to the central portion of the said thimble, said thimble being provided with a plurality of recesses in the outer side thereof, making said thimble adjustable at different positions, said thimble being held in place by set-screws, a hub inclosing all of said parts, and caps screwed on said hub.

2. An axle having a journal square in cross-section, a thimble inclosing said journal and having a hardened outer surface, a plurality of rows of balls surrounding said thimble, a series of rings fitting closely said thimble and adapted to hold said rows in place, a thimble having a hardened inner surface surrounding said balls, a shorter thimble fitting closely the inner surface of said last-mentioned thimble and attached to the central portion thereof, said thimble having a plurality of recesses, making said thimble adjustable at different positions, said first-mentioned thimble having an annular flange on one end and a nut screwed on the other end, and a hub provided with end caps and inclosing all of said parts.

In testimony that I claim the foregoing I have hereunto set my hand this 6th day of November, 1896.

J. B. BAKER.

Witnesses:
B. R. WATTS,
B. W. WATTS.